(12) United States Patent
Suh (10) Patent No.: US 9,409,319 B2
(45) Date of Patent: Aug. 9, 2016

(54) METHOD OF LASER PROCESSING MOLD SURFACE

(71) Applicant: Hyundai Motor Company, Seoul (KR)

(72) Inventor: Chang Soo Suh, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 240 days.

(21) Appl. No.: 14/045,564

(22) Filed: Oct. 3, 2013

(65) Prior Publication Data
US 2015/0001748 A1 Jan. 1, 2015

(30) Foreign Application Priority Data
Jun. 26, 2013 (KR) .................. 10-2013-0073518

(51) Int. Cl.
B29C 33/42 (2006.01)
B29C 33/38 (2006.01)

(52) U.S. Cl.
CPC ........... *B29C 33/3842* (2013.01); *B29C 33/424* (2013.01)

(58) Field of Classification Search
CPC .. B29C 33/3842; B29C 33/424; B29C 45/37; G06F 17/50; B23K 26/0066
See application file for complete search history.

(56) References Cited

U.S. PATENT DOCUMENTS

| | | | | |
|---|---|---|---|---|
| 6,043,452 | A * | 3/2000 | Bestenlehrer | B23K 26/0075 219/121.62 |
| 2007/0055400 | A1* | 3/2007 | El Khaldi et al. | G05B 19/4097 700/97 |
| 2007/0100492 | A1* | 5/2007 | Idaka et al. | G05B 19/4086 700/166 |
| 2008/0110869 | A1* | 5/2008 | Chen | B23K 26/367 219/121.75 |
| 2012/0001908 | A1* | 1/2012 | Kikuta et al. | G06F 17/50 345/419 |

FOREIGN PATENT DOCUMENTS

| | | |
|---|---|---|
| JP | 2003-311831 A | 11/2003 |
| KR | 2002-0085925 A | 11/2002 |
| KR | 10-2005-0118233 A | 12/2005 |
| KR | 10-0826344 B1 | 5/2008 |
| KR | 10-2009-0061380 A | 6/2009 |
| KR | 10-2009-0094778 A | 9/2009 |
| WO | WO 96/31315 A1 | 10/1996 |

OTHER PUBLICATIONS

Pantsar, "Using lasers for decorative 3D texturing", (2008), Industrial Laser Solutions, all pages.*

(Continued)

*Primary Examiner* — Alison L Hindenlang
*Assistant Examiner* — Jerzi H Moreno Hernandez
(74) *Attorney, Agent, or Firm* — Morgan, Lewis & Bockius LLP (57) ABSTRACT

A method of laser processing a mold surface may include a first stage of extracting mapping data for forming an embossing pattern on the mold surface using laser processing, a second stage of extracting scanning data obtained by scanning the mold surface and matching the scanning data with the mapping data so as to extract processing data for laser processing, a third stage of performing a reverse engineering process for verifying error between the mold surface and the processing data when processing the mold surface to form the embossing pattern using the processing data, and a fourth stage of, when the error may be within an allowable tolerance, performing the laser process using a verified processing data.

7 Claims, 5 Drawing Sheets

(56) References Cited

OTHER PUBLICATIONS

Yao (Int J Adv Manuf Technol (2005) 26: 1284-1288).*

Chen (Robotics and Computer Integrated Manufacturing, 2000, 16, 161-167).*

Vaezi (Journal of Applied Sciences, 2009, 9, 2424-2430).*

* cited by examiner

METHOD OF LASER PROCESSING MOLD SURFACE

CROSS-REFERENCE TO RELATED APPLICATION

The present application claims priority to Korean Patent Application No. 10-2013-0073518, filed on Jun. 26, 2013, the entire contents of which is incorporated herein for all purposes by this reference.

BACKGROUND OF THE INVENTION

1. Field of the Invention

The present invention relates, in general, to a method of laser processing a mold surface to form an embossing pattern, thereby improving an appearance of an injection-molded product.

2. Description of the Related Art

According to recent trends in the development of vehicles, in addition to performance, design is considered important. From the point of view of a purchaser, design of a vehicle is an important factor that can affect his or her impression of the vehicle. Thus, the design of various parts of a vehicle has developed. Also, in plastic panels of a vehicle, such as interior and exterior door trims, a dashboard, etc., instead of the hard texture of a plastic, an embossing pattern as similar to clothes is formed on the panel so that the panel looks elegant.

Figure 1:
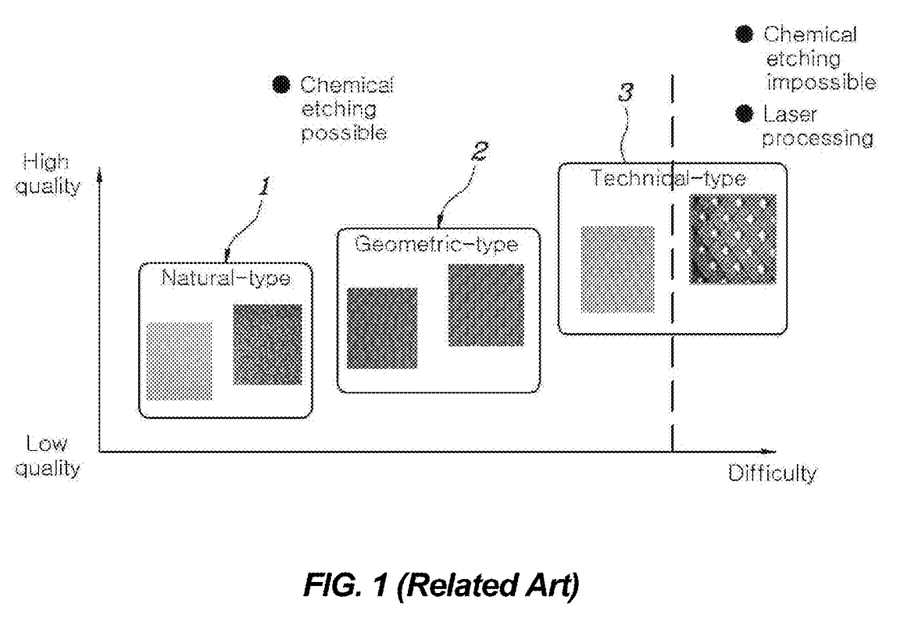
FIG. 1 is a view showing a variety of embossing patterns processed on a mold surface.

In this way, with respect to the embossing pattern formed on the surface of the plastic panel, a cloth-like embossing pattern that highlights the continuity of a pattern is established. As shown in FIG. 1, a natural type embossing pattern 1, which was previously used, has the hard texture like plastic, possibly giving one a cheap look. However, a recently developed cloth-like embossing pattern gives a soft, fabric-like, and sophisticated feeling, further improving occupant's satisfaction.

However, according to a conventional chemical etching method for processing such an embossing pattern, it is only feasible to fabricate a cell type geometric embossing pattern 2 that is not continuous, so a continuous cloth looking embossing pattern cannot be obtained.

Specifically, the chemical etching method for embossing a large-scaled 3D injection mold is carried out such that an embossing pattern is first printed on a mask film with a chemical etching process, the mask film is applied onto a surface of the mold, and the surface is indirectly selective-etched to form the embossing pattern thereon. However, when forming the embossing pattern using the chemical etching method, the mask film is inevitably subjected to stretch and division, causing a seam to be created, which needs a separate repairing process.

Further, upon repairing the seam, the natural type embossing pattern 1 does not exhibit a repaired portion because its shape is atypical, whereas the geometric embossing pattern 2 and a technical embossing pattern 3 exhibit the repaired seam, deteriorating an appearance of a product, and the cloth-like embossing pattern having a continuous linear form is difficult to be formed because, when manually processed, multiple mask films do not match each other, making it difficult to form the continuous pattern.

Thus, there is a need to provide a method of processing a mold surface to form a cloth-like 3D embossing pattern, which could not be obtained using a conventional chemical etching method, thereby improving an appearance of an injection-molded product.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention are directed to providing a method of laser processing a mold surface to form a 3D technical-type cloth-like embossing pattern without producing seams, thereby improving the design and an appearance of a mold product.

In an aspect of the present invention, a method of laser processing a mold surface, may include a first stage of extracting mapping data for forming an embossing pattern on the mold surface using laser processing, a second stage of extracting scanning data obtained by scanning the mold surface and matching the scanning data with the mapping data so as to extract processing data for laser processing, a third stage of performing a reverse engineering process verifying error between the mold surface and the processing data when processing the mold surface to form the embossing pattern using the processing data, and a fourth stage of, when the error is within an allowable tolerance, performing the laser process using a verified processing data.

The first stage may include extracting surface data of the mold surface, rendering the mold surface into a 3D mesh-form expressed the embossing pattern to be embodied a curvature and a shape of the mold surface, based on the surface data of the mold surface, and determining whether or not the embossing pattern is harmonious with a shape of the mold surface, using 3D rendering data.

In the second stage, when the error of the processing data lies beyond the allowable tolerance, the surface data of a section lying beyond the allowable tolerance is corrected.

The reverse engineering process may include dividing an embossing section of the mold surface to be embossed into a plurality of patches, applying wax onto the embossing section, partially laser-processing the respective patches to form the embossing pattern thereon, and determining whether the embossing patterns may have been normally formed to the respective patches of the mold surface.

The plurality of the patches is tilted at an angle such that a direction thereof does not run parallel with the embossing pattern.

The laser processing is performed such that a portion of the mold surface with a first curvature may have first patches, and a portion of the mold surface with a second curvature that is smaller than the first curvature may have second patches wider than the first patches.

The embossing pattern is of a grid-type multiple-pattern including a plurality of first grid structures indicative of the mold surface and a plurality of second grid structures intersecting partially with the first grid structures.

The fourth stage may include dividing an embossing section of the mold surface to be embossed into a plurality of patches, and partially laser-processing the respective patches to form the embossing pattern thereon.

The plurality of the patches is tilted at an angle such that a direction thereof does not run parallel with the embossing pattern.

In the fourth stage, the laser processing is performed such that a portion of the mold surface with a first curvature may have first patches, and a portion of the mold surface with a second curvature that is smaller than the first curvature may have second patches wider than the first patches.

According to the method of laser processing the mold surface, a cloth-like embossing pattern, which could not be feasible with a conventional chemical etching method, can be obtained. Further, a problem of the conventional laser processing is that a patch line exposed because of inaccurate processing data is solved by performing the reverse engineering process, thereby accomplishing a technical-type 3D cloth looking embossing pattern.

Therefore, when embossing the mold surface, seamless and identical embossing patterns are formed, contributing to an improvement in a design of a molded part.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in more detail to a preferred embodiment of the invention, an example of which is illustrated in the accompanying drawings.

Figure 2:
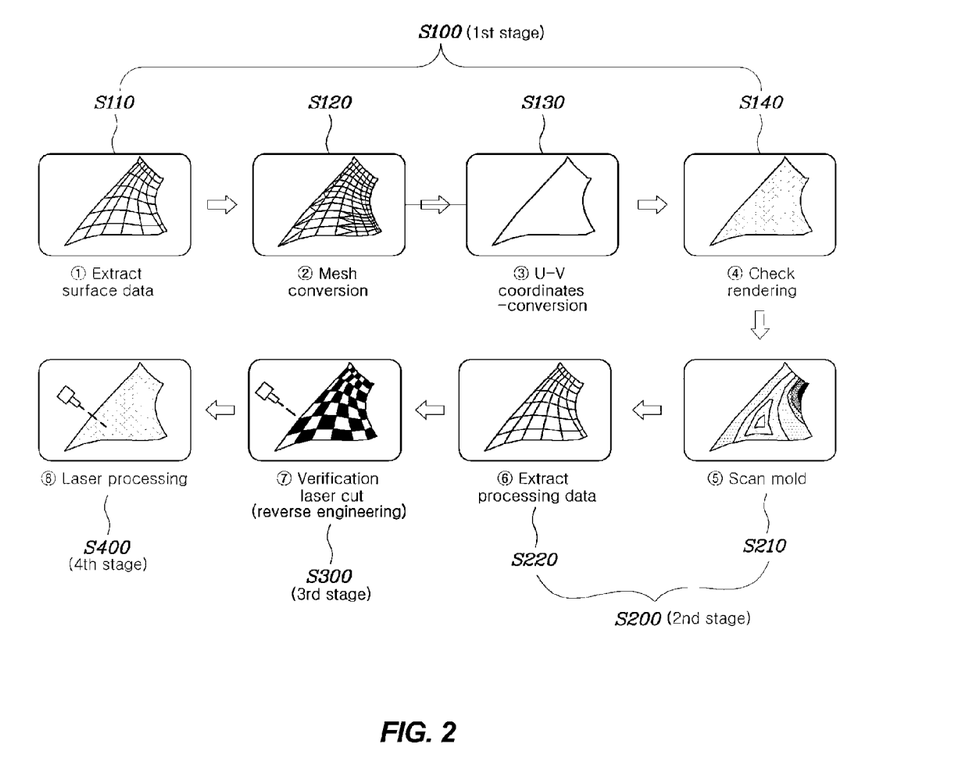
FIG. 2 is a view showing a procedure of laser processing a mold surface according to an exemplary embodiment of the present invention.

FIG. 2 is a view showing a procedure of a method of laser processing a mold surface according to an exemplary embodiment of the present invention. The method includes: a first stage (S100) of extracting mapping data for forming an embossing pattern on the mold surface using laser processing, a second stage (S200) of extracting scanning data obtained by scanning the mold surface and matching the scanning data with the mapping data so as to extract processing data for laser processing, a third stage (S300) of performing a reverse engineering process for verifying an error between the mold surface and the processing data when processing the mold surface to form the embossing pattern using the processing data, and a fourth stage (S400) of, when the error is within an allowable tolerance, performing the laser process using the verified processing data.

As shown in FIG. 2, the first stage (S100) may include: extracting surface data of the mold surface (S110), rendering the mold surface into a 3D mesh-form expressed the embossing pattern (S120) to be embodied a curvature and a shape of the mold surface, based on the surface data of the mold surface, and determining whether or not the embossing pattern is harmonized with the shape of the mold surface using 3D rendering data (S140).

Differently from a conventional chemical etching method, the present invention aims at forming an embossing pattern on a 3D curved surface of a mold using a laser processing method, thereby requiring extracting data of a mold surface and digitizing the extracted data.

First, surface data of the mold surface is extracted from a mold (S110). Here, the surface data may be CAD data showing the mold in a 3D form. Based on the surface data, a curvature and a shape of the mold are configured as a mesh-type form (S120), and converted into U-V coordinates (S130).

Thus, the embossing pattern of 2D data can be mapped to a 3D data surface and the determination that the direction of the embossing pattern is harmonious with that of a shape of the mold can be determined by checking the rendering (S140).

Then, the mold is scanned to extract scanning data (S210), the mapping data is matched with the scanning data, and processing data for performing laser processing is extracted based on the scanning data (S220).

Here, if the tolerance between the mapping data and the scanned data lies beyond the allowable tolerance, surface data of a section that is beyond the allowable tolerance is corrected. That is, if the tolerance of the mapping data with respect to the scanned data lies beyond the allowable tolerance, only the surface data of the section being out of the allowable tolerance is corrected without newly obtaining the mapping data.

If the processing position of the embossing pattern is corrected when the tolerance of the mapping data is beyond the allowable tolerance, it needs to obtain new mapping data, increasing the workload. Further, when laser-processed, the embossing pattern is constantly processed even upon the occurrence of a certain tolerance with respect to a mold, so it is preferred that only the surface data of the section being beyond the allowable tolerance should be corrected.

A reverse engineering process is carried out to previously verify error between the processing data and measured data with respect to the dimensions of the mold when processing the mold to form the embossing pattern using the processing data (S310).

Since, in a case of the laser processing, once an error occurs due to a tolerance, the error can be corrected only by re-processing, the processing data should be previously verified with respect to its validity. To this end, according to an exemplary embodiment of the present invention, the reverse engineering process is carried out such that the processing data lies within the allowable tolerance.

Figure 3:
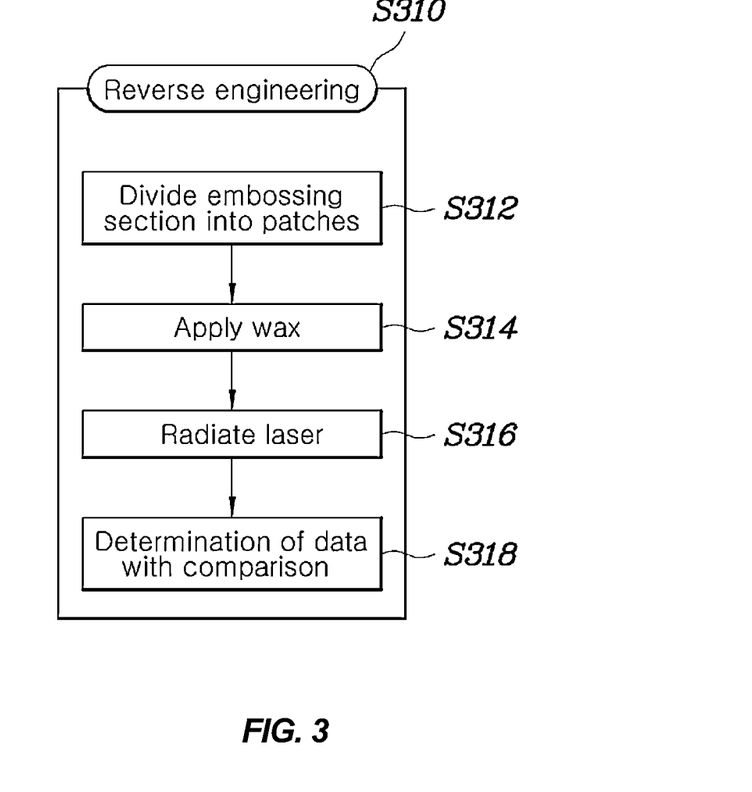
FIG. 3 is a flow chart showing a reverse engineering process in the laser-processing procedure of FIG. 2.

The reverse engineering process (S310) may include: dividing an embossing section of the mold surface to be embossed into a plurality of patches (S312), applying wax onto the embossing section (S314), partially laser-processing the respective patches to form the embossing pattern thereon (S316), and determining whether the embossing patterns have been normally formed to the respective patches of the mold surface (S318).

Specifically, if the tolerance of the processing data lies beyond the allowable tolerance, relevant surface data is corrected, and the embossing section is divided into the plurality of patches according to the shape of the mold, using the corrected mapping data.

In an exemplary embodiment of the present invention, the laser processing is performed for each of the divided patches, and in this case, the direction of the divided patches is tilted at a certain angle such that it is not parallel with the embossing pattern, in order to prevent a patch line from being exposed after the laser processing.

Figure 4:
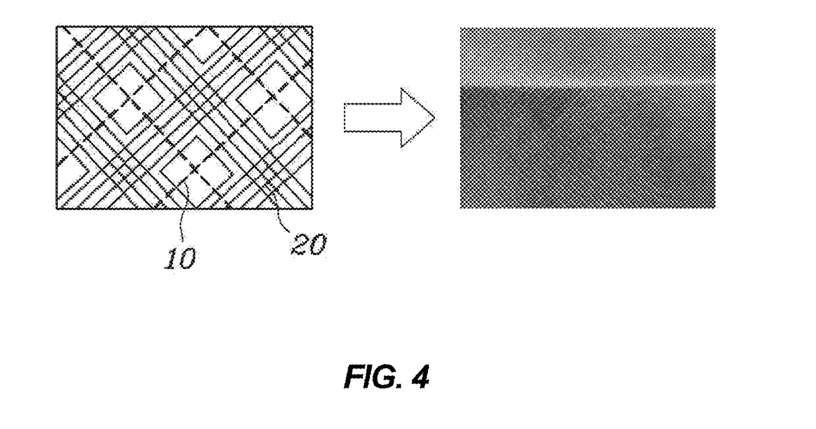
FIG. 4 is a view showing a patch line exposed in a conventional embossing pattern.
Figure 5:
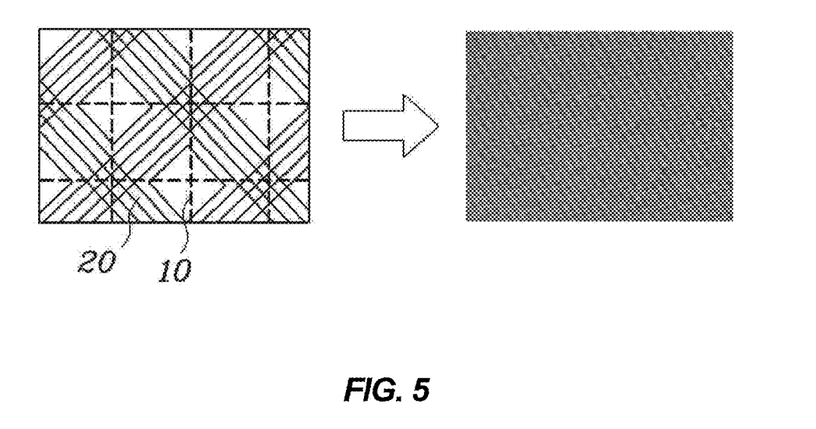
FIG. 5 is a view showing a plurality of patches in an exemplary embossing pattern obtained by the laser-processing procedure of the present invention.

If the direction of the patch 10 is set parallel with the embossing pattern 20 as shown in FIG. 4, the patch line is exposed, deteriorating an appearance of the embossing pattern. To prevent this, the direction of the patch 10 may be set at about 45 degrees with respect to the embossing pattern 20 as shown in FIG. 5, and in this case, the patch line is not exposed so as to improve the appearance of the embossing pattern.

Here, the laser processing may be performed such that a portion of the mold surface with large curvature has narrow patches, and a portion of the mold surface with small curvature has wide patches. According to an exemplary embodiment of the present invention, upon laser processing, a laser is vertically emitted to the respective patches, and in this case, even when the laser is emitted at the same angle to the section with small curvature, such as a flat surface, the embossing pattern can be uniformly formed.

However, at the section with large curvature, it has a limit in performing vertical-laser processing, so the patch is formed to have a small area, enabling precise processing to be carried out. As such, the section with large curvature is more finely processed, so the same embossing patterns are uniformly formed over the entire embossing section of the mold.

In this state, in order to verify the validity of the processing data to laser processing, the embossing section of the mold is applied with wax, and the laser processing is performed for each of the divided patches in the embossing section in a grid pattern with the same dimensions as the respective patches. Here, the wax is a material that is removable during laser processing and may include paraffin wax, synthetic wax, natural wax, or the like.

After the completion of grid-type laser processing over the wax applied onto the embossing section, the processing data that can be used in laser processing the mold surface to form the embossing pattern thereon is verified by visually checking the processed state of the embossing pattern, or otherwise determining the matching of the processing data with the mold surface.

The laser processing is carried out using the processing data verified by the revered engineering process, thereby previously preventing an error of the laser processing from occurring.

Figure 6:
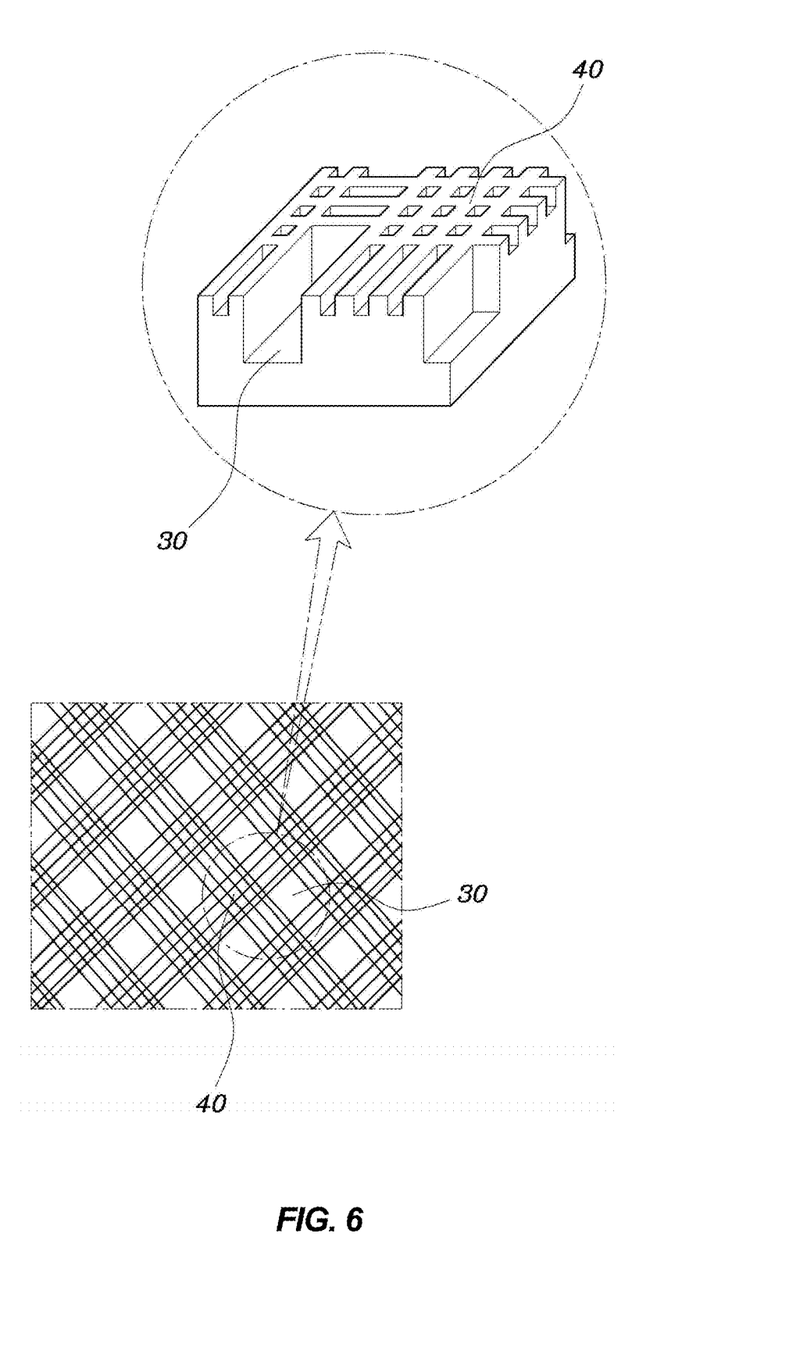
FIG. 6 is a view showing the exemplary embossing pattern obtained according to the laser-processing procedure of the present invention.

Further, the embossing pattern may be of a grid-type multiple-pattern including a plurality of first grid structures 30 indicative of the mold surface and a plurality of second grid structures 40 intersecting partially with the first grid structures 30.

With the configuration of the multiple-pattern of the embossing pattern, in which the plurality of first grid structures 30 indicative of the mold surface and the plurality of second grid structures 40 intersecting with the first grid structures 30 are continuously formed, the cloth-like embossing pattern can be obtained by the laser processing according to an exemplary embodiment of the present invention. Such a cloth-like embossing pattern can be not obtained with the conventional chemical etching method, but with the laser processing, so as to provide a fabric texture and thus increase the elegance or sophistication of a surface of a mold product.

Then, the fourth stage (S400) is carried out, which includes dividing an embossing section of the mold surface to be embossed into a plurality of patches, and partially laser-processing the respective patches to form the embossing pattern thereon.

Here, the plurality of the patches may be tilted at an angle such that the directions thereof do not run parallel with the embossing pattern. Further, the laser processing may be performed such that a portion of the mold surface with large curvature has narrow patches, and a portion of the mold surface with small curvature has wide patches.

That is, the embossing pattern is formed on the mold surface using the same method as the above-mentioned reverse engineering process. The embossing pattern is formed in the same manner using the verified processing data, thereby previously preventing a defective product from being formed due to the error of the processing data, preventing the patch line from being created, and providing a precise embossing pattern, thereby improving an appearance of a molded product.

According to the method of laser processing the mold surface, a cloth-like embossing pattern, which could not be feasible with a conventional chemical etching method, can be obtained. Further, a problem of the conventional laser processing in that a patch line is exposed because of inaccurate processing data is solved by performing the reverse engineering process, thereby accomplishing a technical-type 3D cloth-like embossing pattern.

Therefore, when embossing the mold surface, seamless and identical embossing patterns are formed, contributing to an improvement in a design of a molded part.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of laser processing a mold surface comprising:
   a first stage of extracting mapping data for forming an embossing pattern on the mold surface using laser processing;

a second stage of extracting scanning data obtained by scanning the mold surface and matching the scanning data with the mapping data so as to extract processing data for laser processing;

a third stage of performing a reverse engineering process verifying error between the mold surface and the processing data when processing the mold surface to form the embossing pattern using the processing data; and a fourth stage of, when the error is within an allowable tolerance, performing the laser process using a verified processing data, wherein the first stage comprises extracting surface data of the mold surface, which is CAD data showing the mold in a 3D form;

configuring a curvature and a shape of the mold surface as a 3D mesh-form expressed in the embossing pattern, based on the surface data of the mold surface; and determining whether the direction of the embossing pattern is harmonious with the shape of the mold surface, wherein in the second stage, when the error of the mapping data lies beyond an allowable tolerance, surface data of a section that is beyond the allowable tolerance is corrected so as to extract the processing data, and wherein the reverse engineering process comprises dividing an embossing section of the mold surface to be embossed into a plurality of patches;

applying wax onto the embossing section;

partially laser-processing the respective patches to form the embossing pattern thereon; and determining whether the same embossing patterns have been normally formed to the respective patches of the mold surface.

2. The method according to claim 1, wherein the plurality of the patches are tilted at an angle such that a direction thereof does not run parallel with the embossing pattern.

3. The method according to claim 1, wherein the laser processing is performed such that a portion of the mold surface with a first curvature has first patches, and a portion of the mold surface with a second curvature that is smaller than the first curvature has second patches wider than the first patches.

4. The method according to claim 1, wherein the embossing pattern is of a grid-type multiple-pattern including a plurality of first grid structures indicative of the mold surface and a plurality of second grid structures intersecting partially with the first grid structures.

5. The method according to claim 1, wherein the fourth stage comprises:

dividing an embossing section of the mold surface to be embossed into a plurality of patches; and partially laser-processing the respective patches to form the embossing pattern thereon.

6. The method according to claim 5, wherein the plurality of the patches are tilted at an angle such that a direction thereof does not run parallel with the embossing pattern.

7. The method according to claim 5, wherein in the fourth stage, the laser processing is performed such that a portion of the mold surface with a first curvature has first patches, and a portion of the mold surface with a second curvature that is smaller than the first curvature has second patches wider than the first patches.

* * * * *